United States Patent [19]
Bansbach

[11] Patent Number: 6,161,939
[45] Date of Patent: Dec. 19, 2000

[54] INTERIOR LIGHTING FIXTURE

[75] Inventor: Udo Bansbach, Berlin, Germany

[73] Assignee: Semperlux AG, Berlin, Germany

[21] Appl. No.: 09/305,683

[22] Filed: May 5, 1999

[51] Int. Cl.[7] ............................................. F21S 4/00
[52] U.S. Cl. ........................... 362/223; 362/31; 362/290; 362/307; 362/346
[58] Field of Search .................. 362/297, 223, 362/290, 291, 346, 147, 31, 327, 307, 260

[56] References Cited

U.S. PATENT DOCUMENTS

| | | | |
|---|---|---|---|
| 775,741 | 11/1904 | Zalinski | 362/327 |
| 3,904,866 | 9/1975 | Hayes | 240/10 |
| 4,006,355 | 2/1977 | Shemitz et al. | 362/297 |
| 4,105,293 | 8/1978 | Aizenberg et al. | 350/264 |
| 4,223,374 | 9/1980 | Kimmel | 362/31 |
| 4,729,075 | 3/1988 | Brass | 362/290 |
| 4,811,507 | 3/1989 | Blanchet | 40/546 |
| 4,890,201 | 12/1989 | Toft | 362/31 |
| 4,918,577 | 4/1990 | Furudate | 362/31 |
| 4,974,137 | 11/1990 | Evans, Jr. et al. | 362/147 |
| 5,128,781 | 7/1992 | Ohno et al. | 359/48 |
| 5,178,447 | 1/1993 | Murase et al. | 362/31 |
| 5,190,370 | 3/1993 | Miller et al. | 362/340 |
| 5,228,773 | 7/1993 | Win | 362/339 |
| 5,410,454 | 4/1995 | Murase et al. | 362/31 |
| 5,420,761 | 5/1995 | DuNah et al. | 362/31 |
| 5,575,549 | 11/1996 | Ishikawa et al. | 362/31 |
| 5,852,514 | 12/1998 | Toshima et al. | 362/223 |
| 5,897,201 | 4/1999 | Simon | 362/245 |
| 5,988,826 | 11/1999 | Yokoyama | 362/31 |

FOREIGN PATENT DOCUMENTS

| | | | |
|---|---|---|---|
| 817194 | 5/1937 | France | 362/31 |
| 531469 | 9/1954 | France | 362/31 |
| 583421 | 12/1946 | United Kingdom | 362/223 |

OTHER PUBLICATIONS

Catalog sheet entitled "TypAUREA" distributed at Hanover Fair in Hanover, Germany Apr.20–25, 1998, 2 pages.
Catalog sheet entitled "TypAureus" distributed at Hanover Fair in Hanover, Germany, Apr. 20–25, 1998, 2 pages.

*Primary Examiner*—Sandra O'Shea
*Assistant Examiner*—Peggy A Neils
*Attorney, Agent, or Firm*—Heslin & Rothenberg, P.C.

[57] ABSTRACT

A low-contrast interior lighting fixture for illuminating a room is disclosed. The interior lighting fixture includes an elongated housing, an elongated horizontally-extending light source supported by said housing, and a first and a second horizontally-extending light guiding reflector assemblies. Each of the reflector assemblies has a top reflective surface, a bottom light-emitting surface, and an edge surface disposed between the top reflective surface and the bottom light-emitting surface. Each edge surface is disposed along opposite longitudinal sides of the elongated light source. A plurality of space-apart louvers extends below the light source and between the first and second reflector assemblies. The reflector assemblies are sized and disposed below the housing so that when the interior lighting fixture is viewed from below, the housing is substantially obscured by the bottom light-emitting surfaces. Desirably, the bottom of interior lighting fixture is illuminated so at to appear to be glowing and desirably matched to the environment such as the ceiling or wall of the room so that the observed amount and degree of visual contrast between the lighting fixture and the environment is minimized. In addition, by generally uniformly illuminating the bottom of the interior lighting fixture, the housing is obscured from view which reduces the amount and degree of visual contrast of the observed interior lighting fixture itself.

30 Claims, 3 Drawing Sheets

INTERIOR LIGHTING FIXTURE

FIELD OF THE INVENTION

This invention relates generally to interior lighting fixtures, and more particularly, to low-contrast interior lighting fixtures.

BACKGROUND INFORMATION

One or more interior lighting fixtures are typically mounted or suspended from a ceiling for illuminating a room, and in particular, a work space. Nonuniform illumination of the room can effect the visual comfort of occupants, and in particular, effect the productivity of workers.

For example, differences in brightness or luminance of portions of the room in one's visual field are interpreted as visual information. Too high a contrast (e.g., the degree of difference between light and dark) leads to the reception of non-useful information and/or information overflow that disturbs one's natural perception. Such disturbance has to be continuously ignored which can lead to eye strain, headaches, and other problems.

In addition, with the computer becoming a standard office tool, the need to provide proper illumination has become more important. For example, improper interior lighting often results in glare and/or reflections on a computer monitor. The reflected areas of light, as well as dark areas, due to the surrounding walls, ceiling, and the lighting fixture itself, are visually distracting.

One approach for providing a generally uniformly illuminated room is to provide a backlit ceiling. However, such a backlit ceiling is expensive, typically extends over the entire ceiling surface, and inhibits installation of other equipment below the ceiling.

Another approach for providing a generally uniformly illuminated room is to use indirect lighting fixtures where generally more than ninety percent of the light from the lighting fixture is distributed upwardly towards the ceiling, from which it is diffusely reflected. A drawback with this approach is that the lighting fixture, and in particular the housing of the lighting fixture, shows up as a silhouette against the illuminated ceiling undesirably causing the same effect as having dark areas on the ceiling. Suspending indirect lighting fixtures from the ceiling also increase the silhouetting effect. In addition, with compact indirect lighting fixtures, the performance thereof is sacrificed due to the reduced size and areas to redirect light.

Therefore, there is a need for a low-cost, compactly configured, low-contrast, interior lighting fixture wherein the interior lighting fixture is configured to provide a generally uniformly illuminated body so that the observed visual contrast of the interior lighting fixture and the observed visual contrast between the interior lighting fixture and the environment such as the ceiling or wall of the room, office, etc. is minimized.

SUMMARY OF THE INVENTION

The above-mentioned drawbacks are overcome by the present invention which provides in one aspect an interior lighting fixture having a housing, a light source supported by the housing, and a generally horizontally disposed reflector assembly having a top reflective surface and a bottom light-emitting surface spaced-apart from the top reflective surface. A portion of light from the light source is transmittable between the top reflective surface and the bottom light-emitting surface and emittable from the bottom light-emitting surface. The reflector assembly is sized and disposed below the housing so that when the interior lighting fixture is viewed from below, the housing is substantially obscured by the bottom light-emitting surface.

In another aspect of the present invention, an interior lighting fixture includes an elongated housing, an elongated generally horizontally-extending light source supported by the housing, and first and second generally horizontally-extending elongated reflector assembly. Each of the reflector assemblies has a top reflective surface, a bottom light-emitting surface, and an edge surface disposed between the top reflective surface and the bottom light-emitting surface. Each edge surface is disposed along opposite longitudinal portions of the elongated light source. A plurality of space-apart louvers extends below the light source and between the first and second reflector assemblies. The reflector assemblies are sized and disposed below the housing so that when the interior lighting fixture is viewed from below, the housing is substantially obscured by the bottom light-emitting surfaces.

Desirably, the interior lighting fixture is operable to provide a generally uniformly illuminated bottom light-emitting surface. Most desirably, the bottom light-emitting surface comprises a uniform pattern, the top reflective surface is spaced-apart a constant distance from the bottom light-emitting surface, and wherein the constant distance is operable to provide a generally uniformly illuminated bottom light-emitting surface.

Advantageously, the reflector assemblies are fabricated by coextrusion of a transparent material and a translucent material with the translucent material forming the light-emitting surface.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which.

DETAILED DESCRIPTION OF THE INVENTION

Figure 1:
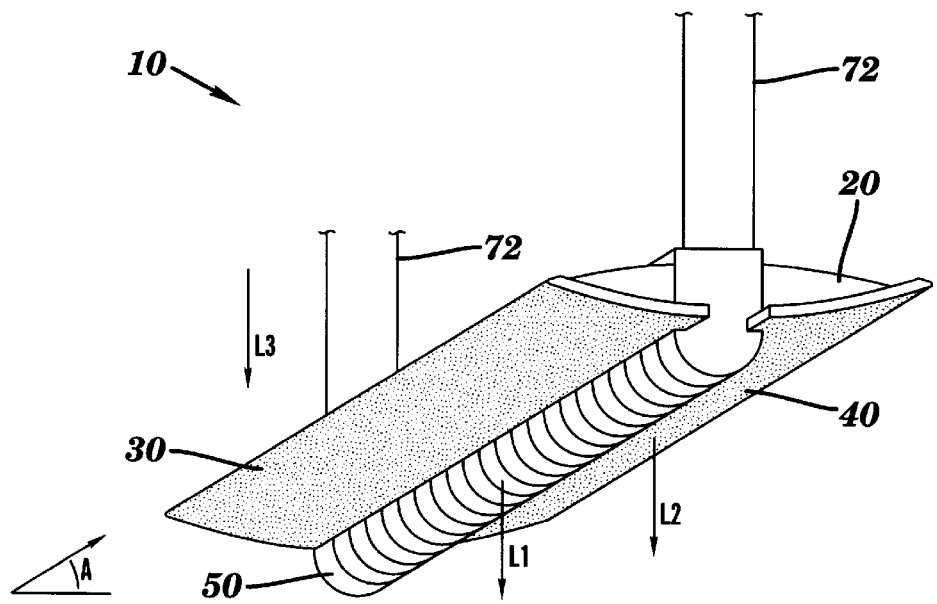
FIG. 1 is a perspective view of one embodiment an interior lighting fixture according to the present invention (the interior lighting fixture when viewed from the other side being the mirror image thereof)
Figure 2:
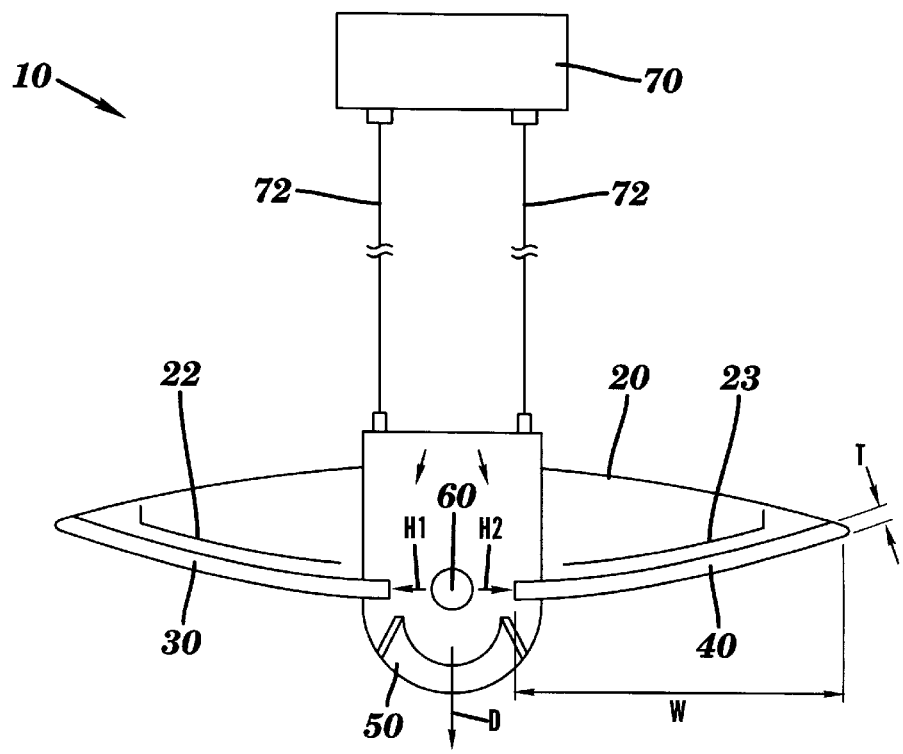
FIG. 2 is an enlarged cross-sectional view of interior lighting fixture of FIG. 1.
Figure 3:
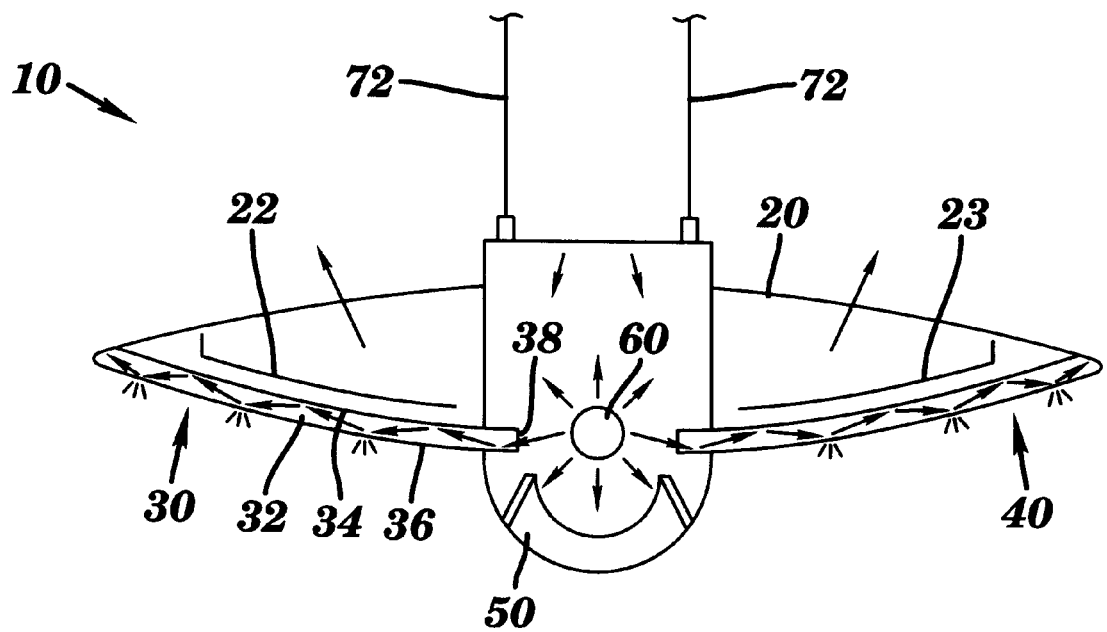
FIG. 3 is an enlarged cross-sectional view the interior lighting fixture shown in FIG. 1.

With reference to FIGS. 1–3, therein illustrated is one embodiment of an interior lighting fixture 10 according to the present invention. Exemplary fixture 10 is desirably suspendable from the ceiling of a building for illuminating a room. As described in greater detail below, bottom or lower portions of interior lighting fixture 10 are illuminated so as to appear to be glowing and desirably matched to the environment such as the ceiling or wall of the room so that the observed amount and degree of visual contrast between the lighting fixture and the environment (when viewed from below at a normal viewing angle, e.g., angle A in FIG. 1) is minimized. In addition, by generally uniformly illuminating the bottom of interior lighting fixture 10, the housing is desirably obscured from view which reduces the amount and degree of visual contrast of the observed interior lighting fixture itself when viewed from below a normal viewing angle.

Interior lighting fixture 10 generally comprises an elongated housing 20, a first curved-shaped, horizontally-extending, light guiding reflector assembly 30 attached to and extending along the bottom of one side of housing 20, a second curved-shaped, horizontally-extending, light guiding reflector assembly 40 attached to and extending along the bottom of the other side of housing 20, a plurality of louvers 50 disposed between first and second reflector assemblies 30 and 40 and longitudinally along the length of interior lighting fixture 10, and an elongated light source 60 (FIG. 2). A suspension system 70 (FIG. 2) comprising a plurality of cables 72 supports interior lighting fixture 10 from a ceiling of a building.

Housing 20 may be fabricated from polished aluminum and includes suitable means, e.g., receptacles or sockets, for supporting and electrically connecting light source 60 to a power supply. Desirably, the light source is a 40 watt or greater linear fluorescent lamp or tube. From the present description, it will be appreciated by those skilled in the art that the interior lighting fixture may include other suitable light sources, e.g., an incandescent lamp or a halogen lamp, as well as two or more light sources may be employed.

As shown in FIG. 2, light source 60 is disposed between first and second light guiding reflector assemblies 30 and 40. Light from light source 60 is desirably projected radially away from light source 60. A portion D of the light from light source 60 is projected downwardly between louvers 60 for illuminating the room. In addition, as explained in greater detail below, a first portion H1 of the light from light source 60 is projected horizontally toward reflector assembly 30 and a second portion H2 of the light from light source 60 is projected horizontally toward reflector assembly 40. Portions H1 and H2 of the light are carried by reflector assemblies 30 and 40 for re-emitting along the bottom surface of curved-shaped reflector assemblies 30 and 40, respectively.

As best shown in FIG. 3, reflector assemblies 30 and 40 are provided with light guiding characteristics to catch light from light source 60 and redistribute is the light for projection from the bottom surface of reflector assemblies 30 and 40. While reference is now made to reflector assembly 30, the description also applies to reflector assembly 40.

Figure 4:
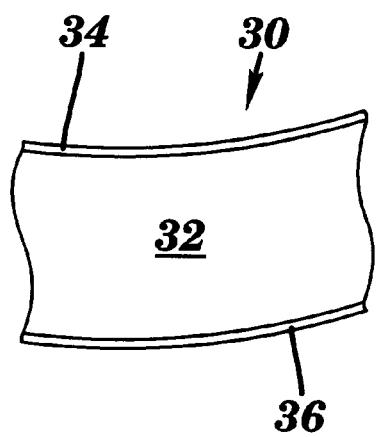
FIG. 4 is a partial, enlarged, cross-sectional view of a light guiding reflector assembly shown in FIG. 3.

With reference to FIG. 4, reflector assembly 30 may comprise a generally clear or transparent material 32 such as a plastic or a glass material, a top reflective surface 34 such a metallic coating or layer, and a bottom light-emitting surface 36 formed by applying a uniform translucent coating, or uniformly etching or sand blasting of the bottom surface of reflector assembly 30 so that desirably the bottom light-emitting surface has a uniform or evenly distributed diffusion pattern or configuration.

Desirably, exemplary light guiding reflector assembly 30 may be formed by coextrusion of a clear or transparent plastic material 32 and a non-clear, non-transparent, or translucent material 36 such as sateen, which forms the bottom light-emitting surface. Once formed, a metallic coating may be applied to the top surface. Desirably, such a coextrusion process permits the reflector assemblies to be readily and inexpensively produced. For example, the transparent material may be an acrylic plastic and the non-transparent material may be a volume satanized material such as sateen or satine available from Rohn, Gmbh. The transparent material is desirably about 6.5 mm thick and the non-transparent material is desirably about 1.5 mm thick.

With reference again to FIG. 3, reflector assembly 30 comprises an edge 38 which is desirably horizontally aligned with the longitudinal axis of the light source and extends along the length of light source 60 as well as desirably perpendicular to rays of light emitted from light source 60. Light projected from the light source enters transparent material 32 via edge 38, and is transmitted inside transparent material 32 along its width W by being reflected off top reflective surface 34, and selectively diffused or re-emitted along bottom light-emitting surface 36. One exemplary ray of light through each reflector assembly is illustrated in FIG. 3. Top reflective surface 34 also serves to prevent viewing through reflector assembly 30 when observed from below.

Reflector assembly 30 desirably has a generally constant thickness which may be readily and inexpensively fabricated by extrusion, and preferably, coextrusion of a transparent material and a translucent material which forms the bottom light-emitting surface. The selection of the transparent material, the shape (e.g., thickness T and width W as shown in FIG. 1) and the uniformly treated bottom light-emitting surface are desirably chosen so that the bottom surface of the reflector assembly has a generally uniformly illuminated or glowing aesthetic appearance during use. Desirably, transparent material 32 has a constant thickness about 4 mm to about 25 mm, and preferably a thickness about 6.5 mm so that a bottom light-emitting surface has a generally uniformly illuminated bottom surface even though bottom light-emitting surface has a generally uniform pattern.

Since the intensity of light from the light source is reduced as the distance from the light source is increased, it is also possible to effect a uniform illumination of the bottom light-emitting surface by providing a light guiding reflector assembly having a tapering cross-sectional thickness, and/or providing a bottom light-emitting surface having a nonuniform or varying pattern, (e.g., where the pattern is less dense near the light source and gradually increases to greater density further away from the light source). However, providing a uniformly illuminated surface by providing the light guiding reflector assembly with a desired width, a constant thickness, and a light-emitting surface having a uniform pattern, avoids the costs associated with configuring the reflectors to have a tapered configuration and/or a light-emitting surface having a nonuniform varying pattern.

With reference again to FIG. 1, desirably the visible lower surface of interior lighting fixture 10 below louvers 50 has a luminance L1, the lower surface of interior lighting fixture 10 below the reflectors have a luminance L2 and a ceiling (not shown) has a luminance L3. Desirably, louvers 50 have reflective surfaces, e.g., being fabricated from polished aluminum, so that luminance L1 below the louvers is due to light projected downwardly from the light source between the louvers, and also due to light being reflected off the sides of the louvers. To avoid too high a contrast, the following relationships of luminances are desired: L1/L2=about 0.3 to about 3 and L2/L3=about 0.3 to about 3. In addition, the following average luminances are desirably employed: L1 between about 100 cd/sqm (candela per square meter) and about 1000 cd/sqm, L2 between about 200 cd/sqm and about 1000 cd/sqm and L3 between about 400 cd/sqm and about 1000 cd/sqm. To reduce the luminance directly under the light source, a combination of louvers and acrylic diffusers therebetween, or a perforated cover or shield, may be employed below the light source.

Configuring interior lighting fixture so that the light guiding reflector assemblies are disposed along the bottom side of the housing avoids the appearance of the housing having dark portions whereby the degree and amount of contrast of the interior lighting fixture itself is minimized. Configuring luminance L2 to be generally equal to the illuminance L3 of the room, the degree and amount of contrast between the interior lighting fixture and environment is also minimized. Minimizing the amount and degree of contrast reduces visual distractions in a room and thus reduces the likelihood of eye strain, headaches, and other problems to occupants in the room.

Figure 5:
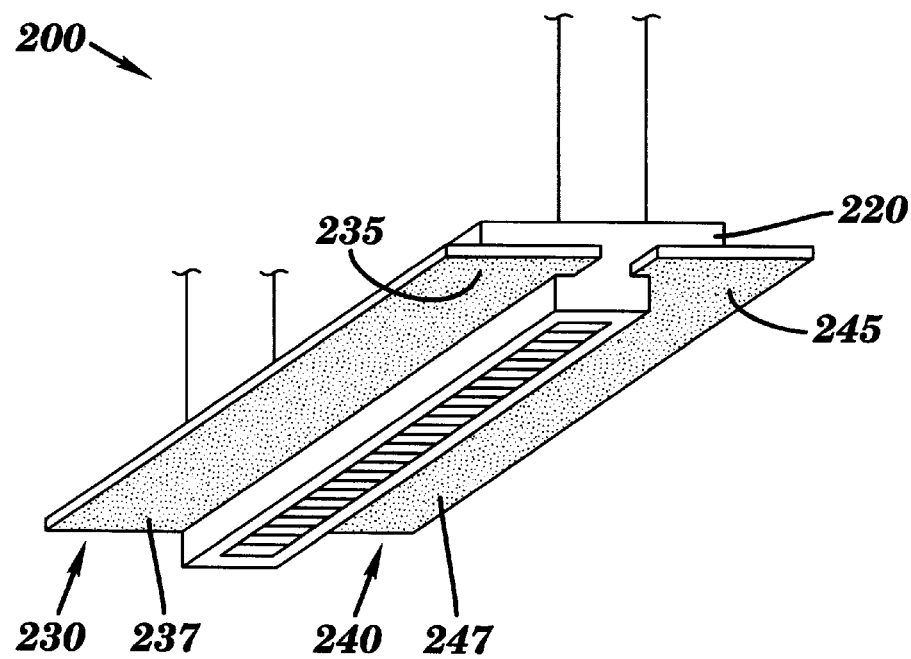
FIG. 5 is a perspective view of an alternative embodiment of an interior lighting fixture according to the present invention (the interior lighting fixture when viewed from the other side being the mirror image thereof)
Figure 6:
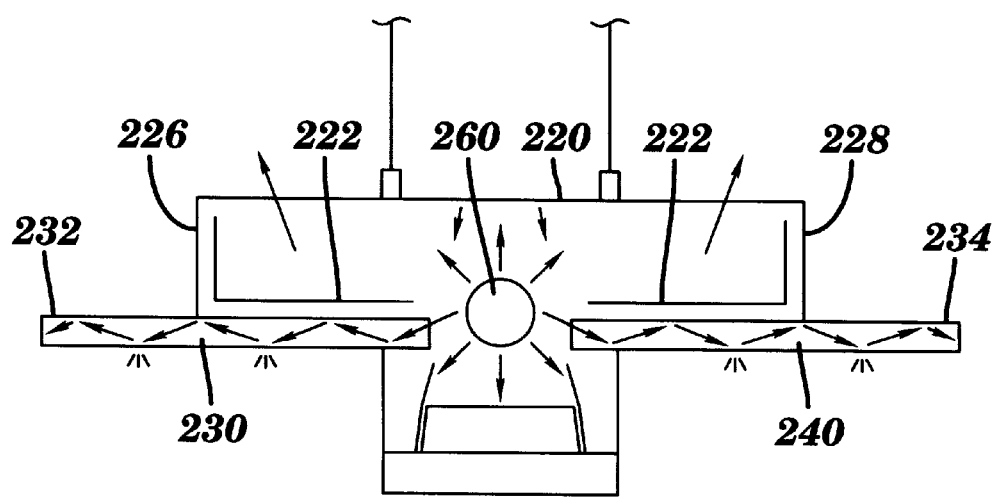
FIG. 6 is an enlarged cross-sectional view of the interior lighting fixture shown in FIG. 5.

FIGS. 5 and 6 illustrate an alternative embodiment of an interior lighting fixture 200 according to the present invention. Interior lighting fixture 200 is essentially the same as interior lighting fixture 10 with the exception of reflector assemblies 230 and 24 are being configured to have a generally flat constant thickness, planar-shaped configuration. In this alternative embodiment, desirably reflector assemblies 230 and 240 have a width so that side portion 232 and 234 of the reflector assemblies extend laterally outward away from the longitudinal sides 226 and 228 of housing 220. Most desirably, end portions 235, 237, 245, and 247 of reflector assemblies 230 and 247 desirably also extend outwardly away from the ends of housing 222 (FIG. 5). Thus, the reflector assemblies are configured and disposed in covering relation to the housing when viewed from below. From the present description, it will be appreciated by those skilled in the art that other shapes for the reflector assemblies may be suitably employed.

The various embodiments of the present invention may be configured to provide direct lighting where the housing inhibits or prevents light from being projected upwardly. In addition, the interior lighting fixture may be configured for indirect lighting where the housing includes openings and/or one or more reflective layers or materials (e.g., reflective layers 22 and 23 in FIG. 3, and reflective layers 222 and 223 in FIG. 6) to transmit light upwardly. Furthermore, the interior lighting fixture of the present invention may be configured as a combination indirect/direct interior lighting fixture. Desirably, upwardly directed light from the light source can be directed off the housing and downwardly between the louvers.

In addition, desirably the interior lighting fixture may be compactly configured having a height of about three to about five inches since the reflector assemblies of the interior lighting fixture of the present invention receive horizontally projected light from the light source.

Thus, while various embodiments of the present invention have been illustrated and described, it will be appreciated to those skilled in the art that many changes and modifications may be made there unto without departing from the spirit and scope of the invention.

What is claimed is:

1. An interior lighting fixture comprising:
   a housing;
   a light source supported by said housing;
   a reflector assembly comprising a coextrusion of a generally transparent material and a generally non-transparent material, a top reflective surface disposed along said generally transparent material, said non-transparent material defining a bottom light-emitting surface spaced-apart from said top reflective surface, a portion of light from said light source being transmittable through said generally transparent material between said top reflective surface and said bottom light-emitting surface and the portion of the light being diffuseably emittable from said bottom light-emitting surface; and
   wherein said reflector assembly is sized and disposed below said housing so that when said interior lighting fixture is viewed from below at an angle, said housing is substantially obscured by said bottom light-emitting surface.

2. The interior lighting fixture of claim 1 wherein said bottom light-emitting surface extends outwardly from said housing.

3. The interior lighting fixture of claim 1 wherein said bottom light-emitting surface extends outwardly from and substantially around said housing.

4. The interior lighting fixture of claim 1 wherein said interior lighting fixture is operable to provide a generally uniformly illuminated bottom light-emitting surface.

5. The interior lighting fixture of claim 1 wherein said bottom light-emitting surface comprises a generally uniform pattern.

6. The interior lighting fixture of claim 1 wherein said non-transparent material comprises a volume satinised material.

7. The interior lighting fixture of claim 1 wherein said transparent material comprises an acrylic plastic material and said non-transparent material comprises satine.

8. The interior lighting fixture of claim 1 wherein said interior lighting fixture is operable to provide a first luminance below said bottom light-emitting surface and a second luminance below said light source, and wherein said first luminance is different from said second luminance.

9. The interior lighting fixture of claim 1 wherein said interior lighting fixture is operable to provide a first luminance below said bottom light-emitting surface and a second luminance below said light source, and wherein a ratio of said first luminance to said second luminance is between about 0.3 to about 3.

10. The interior lighting fixture of claim 9 wherein said first luminance is between about 200 cd/sqm to about 1000 cd/sqm.

11. The interior lighting fixture of claim 10 wherein second luminance is between about 100 cd/sqm to about 1000 cd/sqm.

12. The interior lighting fixture of claim 1 wherein said reflector assembly comprises a curved-shaped cross-section.

13. The interior lighting fixture of claim 12 wherein said reflector assembly comprises a constant cross-sectional thickness.

14. The interior lighting fixture of claim 1 wherein said bottom light-emitting surface comprises a generally uniform pattern, said top reflective surface is spaced-apart a constant distance from said bottom light-emitting surface, and wherein said constant distance is sized to provide a generally uniformly illuminated bottom light-emitting surface.

15. The interior lighting fixture of claim 14 wherein said top reflective surface is spaced-apart about 6.5 mm from said bottom light-emitting surface.

16. The interior lighting fixture of claim 1 wherein a portion of light from said light source is transmitted upwardly toward a ceiling of a room.

17. The interior lighting fixture of claim 1 further comprising means for suspending said housing from a ceiling of the room.

18. An interior lighting fixture comprising:

an elongated housing;

an elongated generally horizontally-extending light source supported by said housing;

a first and a second generally horizontally-extending elongated reflector assemblies, each of said elongated reflector assemblies comprising a coextrusion of a generally transparent material and a generally non-transparent material, a top reflective surface disposed along said generally transparent material, said non-transparent material defining a bottom light-emitting surface, and an edge surface disposed along said generally transparent material between said top reflective surface and said bottom light-emitting surface, each of said edge surfaces being disposed along opposite longitudinal portions of said light source, and a portion of light from the light source being transmittable through said edge surfaces, said generally transparent material and diffuseably emittable from said bottom light-emitting surfaces;

a plurality of space-apart louvers extending below said light source and between said first and second reflector assemblies; and wherein said reflector assemblies are sized and disposed below said housing so that when said interior lighting fixture is viewed from below at an angle, said housing is substantially obscured by said bottom light-emitting surfaces.

19. The interior lighting fixture of claim 18 wherein said bottom light-emitting surface extends outwardly from said housing.

20. The interior lighting fixture of claim 18 wherein said light source is generally horizontally aligned with said edge surfaces of said reflectors.

21. The interior lighting fixture of claim 18 wherein each said reflector assemblies comprises a transparent material having a reflective layer forming said top reflective surface and a translucent material forming said light-emitting surface.

22. The interior lighting fixture of claim 18 wherein each of said reflector assemblies comprises a constant cross-sectional thickness and a curved-shaped configuration.

23. The interior lighting fixture of claim 18 wherein said interior lighting fixture is operable to provide a first luminance below said bottom light-emitting surface and a second luminance below said light source, and wherein a ratio of said first luminance to said second luminance is between about 0.3 to about 3.

24. The interior lighting fixture of claim 18 wherein said bottom light-emitting surface comprises a generally uniform pattern, said top reflective surface is spaced-apart a constant distance from said bottom light-emitting surface, and wherein said constant distance is sized to provide a generally uniformly illuminated bottom light-emitting surface.

25. The interior lighting fixture of claim 24 wherein said top reflective surface is spaced-apart about 6.5 mm from said bottom light-emitting surface.

26. The interior lighting fixture of claim 18 wherein an upwardly directly portion of light from said light source is redirected by said housing downwardly between said louvers.

27. The interior lighting fixture of claim 18 further comprising means for suspending said housing from a ceiling of a room.

28. A method of illuminating a room comprising:

providing a housing;

providing a light source in the housing;

providing a reflector assembly disposed generally below the housing, the reflector assembly comprising a coextrusion of a generally transparent material and a generally non-transparent material, a top reflective surface disposed along said generally transparent material, said non-transparent material defining a bottom light-emitting surface spaced-apart from said top reflective surface; and transmitting a portion of light from the light source through said generally transparent material between the top reflective surface and the bottom light-emitting surface and diffuseably emitting the portion of light from the bottom light-emitting surface so that when the housing, the light source, and the reflector assembly which define an interior lighting fixture is viewed from below at an angle, the housing is substantially obscured by the bottom light-emitting surface.

29. The method of claim 28 wherein the housing, the light source and the reflector assembly are elongated, and the bottom light-emitting surface substantially obscures a longitudinal side portion of the housing when viewed from below.

30. The method of claim 28 wherein the providing a reflector comprises providing a pair of reflector assemblies, each of which being disposed on opposite portions of the light source, and further comprising providing a plurality louvers below the light source and between the pair of reflector assemblies.

* * * * *